United States Patent [19]

Kurosawa

[11] Patent Number: 4,924,393
[45] Date of Patent: May 8, 1990

[54] ACTIVE SUSPENSION FOR A VEHICLE CONTROLLING BODY FOR COMBINATION OF BOUNCE AND PITCH BASED ON HEIGHT SENSOR SIGNALS

[75] Inventor: Ryuichi Kurosawa, Numazu, Japan

[73] Assignee: Toyota Jidosha Kabushiki Kaisha, Japan

[21] Appl. No.: 220,687

[22] Filed: Jul. 18, 1988

[30] Foreign Application Priority Data

Jul. 24, 1987 [JP] Japan ................................. 62-185862

[51] Int. Cl.$^5$ ............................................. B60G 17/00
[52] U.S. Cl. ................................. 364/424.05; 280/703; 280/707
[58] Field of Search .................... 364/424.05; 280/703, 280/707, 840, 772

[56] References Cited

U.S. PATENT DOCUMENTS

| | | | |
|---|---|---|---|
| 4,625,993 | 12/1986 | Williams et al. | 280/707 |
| 4,686,626 | 8/1987 | Kuroki et al. | 280/707 |
| 4,712,807 | 12/1987 | Kurosawa | 280/707 |
| 4,717,173 | 1/1988 | Sugasawa et al. | 280/707 |
| 4,733,883 | 3/1988 | Sugasawa et al. | 280/707 |
| 4,741,554 | 5/1988 | Okamoto | 280/703 |
| 4,825,370 | 4/1989 | Kurosawa | 280/707 |
| 4,837,694 | 6/1989 | Narita et al. | 364/424.05 |

Primary Examiner—Gary Chin
Attorney, Agent, or Firm—Oliff & Berridge

[57] ABSTRACT

An active suspension for a vehicle including cylinder-piston type actuators each supporting the vehicle body relative to each of front right, front left, rear right and rear left wheels, height sensors for detecting height Hfr, Hfl, Hrr and Hrl of the vehicle body at the front right, the front left, the rear right and the rear left wheel, and a calculation control device which calculates based on height signals from the height sensors a bounce amount B and a pitch amount P with respect to the road surface from a standard state of the vehicle body according to:

$$B = Kb \, (Hfr + Hfl + Hrr + Hrl - 4H)$$

$$P = Kp \, \{(Hrr + Hrl) - (Hfr + Hfl)\}$$

(where Kb and Kp are positive coefficients, and H is the mean value of standard vehicle heights of the portions of the vehicle body corresponding to respective wheels at the standard state of the vehicle body), calculates based on the amount B and P the supporting force for the actuators necessary to reduce the bounce and the pitch amount, and controls the actuators based on the calculation results to increase or decrease the force acting between the wheels and the vehicle body through the actuators.

5 Claims, 10 Drawing Sheets

ACTIVE SUSPENSION FOR A VEHICLE CONTROLLING BODY FOR COMBINATION OF BOUNCE AND PITCH BASED ON HEIGHT SENSOR SIGNALS

BACKGROUND OF THE INVENTION

1. Field of the Invention

The present invention relates to a suspension for a vehicle such as an automobile, and more particularly, to an active suspension which incorporates servo actuators for supporting the vehicle body from the vehicle wheels.

2. Description of the Prior Art

In the article "Suspension without springs" in the magazine "Motor" published in Great Britain on 10 September 1983, in the article "On active service" in the magazine "Autocar" published in Great Britain on 10 September 1983, and in Japanese Patent Laying-open Publication 60-500662 (1985), there is disclosed a suspension having a plurality of electro-hydraulic type servo actuators provided corresponding to each vehicle wheel and producing a support force to support the vehicle body with respect to the corresponding vehicle wheel, a movement detection means detecting the amount of relative movement between the vehicle wheel and the vehicle body, and a control means controlling an increase or decrease in the support force of each servo actuator based on a signal from the movement detection means.

In the above described suspension, when there is a relative movement between the vehicle wheel and the vehicle body caused by irregularities in the road surface, each actuator produces a support force corresponding to the relative amount of movement, and therefore, as the vehicle incorporating this suspension travels over an irregular road surface, the support force of each actuator with respect to the vehicle body is increased and decreased. This increasing or decreasing force is transmitted to the vehicle body, and as a result, the vehicle body will oscillate vertically in the same way as in a vehicle incorporating a conventional spring type of suspension. In other words the suspension described in the above bibliography, in spite of incorporation of the servo actuators, behaves like a conventional suspension based upon the springs and the shock absorbers, and therefore, this suspension does not prevent vertical oscillation of the vehicle body when the vehicle is traveling over an irregular road surface or the like.

In view of the above described problem in the suspension described in the above bibliography, as a new active suspension constructed so that when a vehicle is traveling over a road surface with irregularities within a stroke limit of the actuators there is absolutely no vertical oscillation of the vehicle, and when the vehicle is traveling over a road surface such as a hill or with large undulations, the vehicle moves smoothly with the road surface, so that the ride comfort of the vehicle can be substantially improved as compared with a conventional spring type suspension or the suspension described in the above bibliography, the present inventor has proposed, in Japanese Patent Application 61-180942 (1986) filed on 31 July 1986 and laid open to public on 18 February 1988, an active suspension for a vehicle comprising: a plurality of cylinder-piston type actuators provided corresponding to each vehicle wheel and producing a supporting force supporting said vehicle body with respect to the corresponding vehicle wheel; a movement detection means detecting the amount of relative movement between said vehicle wheel and said vehicle body; a means for determining the rate of relative movement between said vehicle wheel and said vehicle body; and a calculation control unit which receives from said movement detection means and said means for determining the rate of relative movement respectively a signal indicating the amount of relative movement between said vehicle wheel and said vehicle body and a signal indicating the rate of relative movement between said vehicle wheel and said vehicle body, determines based on these signals the vertical displacement of the road surface, controls, when the vertical displacement of said road surface is within the stroke limit of said actuator, said actuator to produce a support force sufficient to support the appropriate load component of said vehicle body, and calculates, when the vertical displacement of said road surface is in excess of the stroke limit of said actuator, the value corresponding to the support force of said actuator necessary to travel along said road surface based on said decision result, and controls said actuator based on this calculation result and increases or decreases the force acting between said vehicle wheel and said vehicle body through the actuator, and has further proposed a similar active suspension for a vehicle in which additionally a comparison is made of the actual support force of said actuator detected by a load detection means and the calculated load force from said calculation control means, and a feedback control is carried out in order that the difference between these two is brought to zero.

According to the active suspension of the above proposal, when the vertical variation in the road surface is within the stroke limit of the actuator, then each actuator is controlled so as to produce a support force sufficient to support the appropriate component of the weight of the vehicle body, and as a result the vehicle body is supported by a constant force from the actuators, and the vertical displacement of the vehicle wheels following the road surface is not transmitted to the vehicle body and therefore when the vehicle is traveling over a level road surface or a road surface with small undulations, the drive attitude of the vehicle (for example horizontal motion in the case of driving horizontally) is maintained by inertia, and there is absolutely no vertical oscillation.

When the vertical variation in the road surface exceeds the stroke limit of the actuators, based on the determination result of the vertical variation in the road surface a value corresponding to the support force necessary for each actuator for driving over this road surface is computed, the actuators are controlled based on this computation result, and the force acting between the vehicle wheel and the vehicle body through the actuator is increased or decreased, and as a result, when the vehicle is traveling over a road surface with large undulations or a hill, the vehicle body moves vertically corresponding to the vertical displacement of the road surface in such a way that the piston of the actuator does not move relative to the cylinder to exceed the stroke limit, and thereby the vehicle body is also caused to move smoothly along the road surface.

However, in an active suspension according to the above proposal, in the case that as in that embodiment the actuators are controlled based on the relative displacement between the vehicle wheels and the vehicle body and the average value of the relative displacement between the rear wheels and the vehicle body, then the vehicle can be caused to run along the road surface even on inclines and large unevennesses, but it is not possible to make the vehicle body travel parallel to the road surface. For example, when the vehicle is running along a horizontal road, and begins to climb a hill, the vehicle body will begin to climb the hill in a horizontal state, and may give the occupants of the vehicle an uncomfortable feeling.

Furthermore, in the case that the active suspension of the above described prior proposal is provided on each vehicle wheel, the vehicle body can be caused to travel parallel to the road surface, but since the actuators are controlled mutually independently, it is difficult to provide a balanced control over all the vehicle wheels, and since the control results of the actuator for one vehicle wheel have an effect on the motion of portions corresponding to other vehicle wheels, then there is the problem that the vehicle body attitude may easily become unstable.

The present invention considers the above described problems in the active suspension of the above described prior proposal, and has as its object the provision of an improved active suspension such that not only is it possible to cause the vehicle to travel along the road surface even in the case of an incline or large unevenness, but also to ensure that the vehicle body moves parallel to the road surface in a stable attitude.

SUMMARY OF THE INVENTION

The above objective is achieved according to the present invention by an active suspension for a vehicle having a vehicle body, a front right wheel, a front left wheel, a rear right wheel, and a rear left wheel, comprising: a plurality of cylinder-piston type actuators, each producing a supporting force for supporting the vehicle body with respect to each corresponding one of said wheels; a plurality of vehicle height detection means detecting vehicle heights Hfr, Hfl, Hrr and Hrl of portions of the vehicle body corresponding to the front right wheel, the front left wheel, the rear right wheel, and the rear left wheel; and a calculation control device which inputs signals from said vehicle height detection means, calculates based on these signals a bounce amount B and a pitch amount P with respect to a road surface from a standard state of the vehicle body according to:

$$B = Kb(Hfr + Hfl + Hrr + Hrl - 4 H)$$

$$P = Kp\{(Hrr + Hrl) - (Hfr + Hfl)\}$$

(where Kb and Kp are positive coefficients, and H is the mean value of standard vehicle heights of said portions of the vehicle body corresponding to said respective wheels at the standard state of the vehicle body), calculates based on said amount B and P the supporting force for said actuators necessary to reduce the bounce and the pitch amount, and controls said actuators based on the calculation results to increases or decrease the force acting between the wheels and the vehicle body through the actuators.

Said actuators may preferably be servo actuators each being operated to increase or decrease said supporting force provided thereby according to a positive or negative balance between an input signal based upon said calculation results and a feedback signal representing said supporting force provided thereby.

In this case, when the rate of change of the amount of said bounce or pitch is larger than a predetermined value, said calculation control device may change said input signal so as to control the absolute speed of the vehicle body to follow a predetermined variation performance.

Further, when the amount of said bounce or pitch is larger than a predetermined value, said calculation control device may further change said input signal so as to control the absolute displacement of the vehicle body to follow a predetermined variation performance.

Still further, said calculation control device may further calculate based on said signals a roll amount R with respect to the road surface from the standard state of the vehicle body according to:

$$R = Kr\{(Hfl + Hrl) - (Hfr + Hrr)\}$$

(where Kr is a positive coefficient), calculate based on said amount B, P and R the supporting force for said actuators necessary to reduce the bounce, the pitch and the roll amount, the control said actuators based on the calculation results to increases or decrease the force acting between the wheels and the vehicle body through the actuators.

The present invention will now be described in detail with reference to the accompanying drawings and in terms of embodiments.

DESCRIPTION OF THE PREFERRED EMBODIMENT

Figure 1:
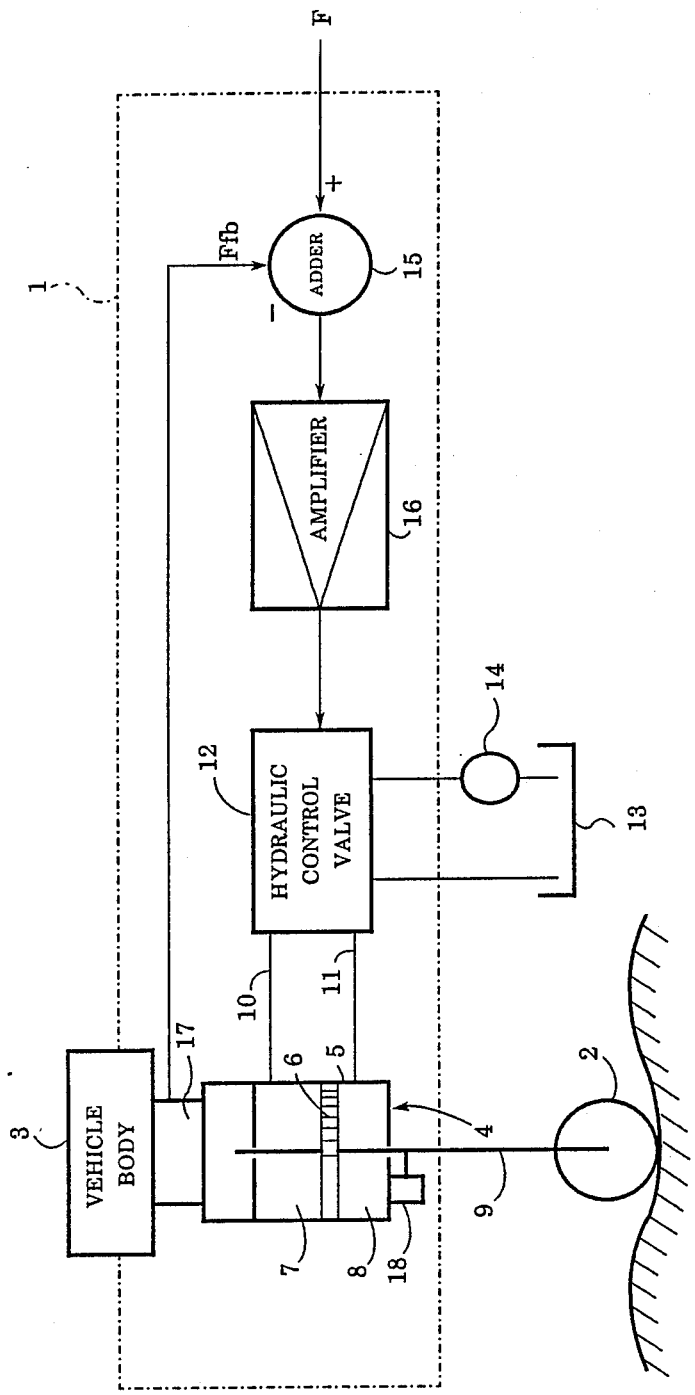
FIG. 1 is a schematic structural diagram showing one servo actuator of one embodiment of the vehicle active suspension according to the present invention.
Figure 2:
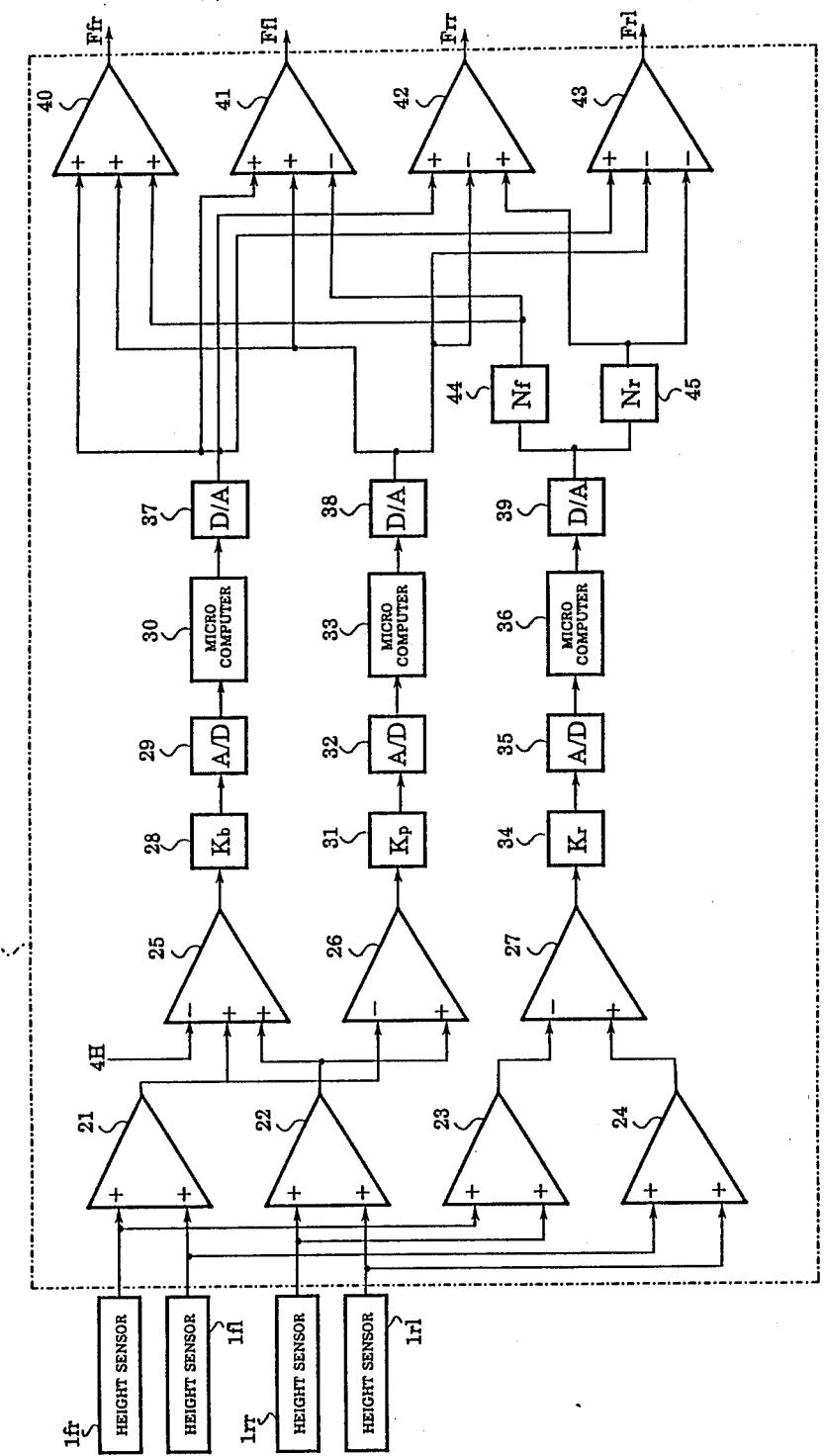
FIG. 2 is a block line diagram showing essential portions of an electronic control device of an embodiment of the vehicle active suspension according to the present invention incorporating all of the bounce, pitch and roll control systems.

Referring to FIG. 1, 1 indicates a servo actuator, and as shown by 1fr, 1fl, 1rr and 1rl in FIG. 2, four servo actuators are provided corresponding to the front right wheel, front left wheel, rear right wheel and rear left wheel respectively of the vehicle. Each servo actuator 1 is provided between one of the vehicle wheels 2 and the vehicle body 3, and has an actuator 4 which supports the vehicle body with respect to the corresponding wheel. In the embodiment shown in the drawing, the actuator 4 is a cylinder-piston device, comprising a cylinder 5 and a piston 6 which is inserted into the cylinder and is able to move relatively with respect to the cylinder substantially in a vertical direction only; the cylinder 5 and the piston 6 together delineate an upper chamber 7 and a lower chamber 8. A rod 9 is fixed to the piston 6, and the rod 9 extends through both end walls of the cylinder 5 so that even when the piston moves reciprocally within the cylinder, the volume occupied by the rod within the cylinder does not vary. At the lower end of the rod 9 is supported a vehicle wheel 2 so as to be rotatable about an axis extending substantially in the direction lateral of the vehicle.

The upper chamber 7 and the lower chamber 8 are connected communicatingly by lines 10 and 11 respectively to an electromagnetic type hydraulic servo valve 12. The hydraulic servo valve 12 may be of a per se well known construction, in constant connection to receive high pressure operating fluid produced by a hydraulic generating device 14 such as a pump which takes up operating fluid stored in a reservoir 13, such that after the operating fluid is passed through an internal variable orifice the operating fluid is returned to the reservoir 13, and such that by controlling the flow rate of operating fluid in the variable orifice, if the pressures within the upper chamber 7 and lower chamber 8 are P1 and P2 respectively (P1>P2), the pressure difference (P1−P2) between the pressure in the upper chamber 7 and the lower chamber 8 can be controlled to be an arbitrary value. In the embodiment shown in the drawing, the hydraulic servo valve 12 of each servo actuator is controlled by a control signal (voltage signal) input through an amplifier 16 from an adder 15, and when the voltage of the control signal input from the amplifier 16 is zero (as described in detail below, the case when the signals input to the adder 15 are Ffb=FO and Fc=O), the force expressed by the product A (P1−P2) of the pressure difference (P1−P2) and the cross-sectional area A of the piston 6 is controlled to be equal to the corresponding load component of the vehicle body 3 in order to support the vehicle wheels 2, by maintaining the pressure difference (P1−P2) of the actuator 4 of each of the servo actuators 1fr, 1fl, 1rr and 1rl to respectively constant values Pfr, Pfl, Prr and Prl, and in the case that the voltage of the control signal input to the amplifier 16 has a value which is positive or negative, the pressure difference (P1−P2) is increased or decreased according to the absolute value of the respective voltage.

Between the vehicle body 3 and each actuator 4 is provided a load sensor 17, and this load sensor detects the actual load effective between the vehicle body 3 and each vehicle wheel 2, or in other words the support force with which the actuator 4 supports the vehicle body 3 with respect to the vehicle wheel 2, and outputs a voltage signal Ffb corresponding to this support force to the minus terminal of the adder 15.

Also in the embodiment shown in the drawing, as indicated by 18 in FIG. 1, a vehicle height sensor is provided which by detecting the relative displacement between the cylinder 5 and the rod 9 of the actuator of each servo actuator, detects the vehicle height of the portion corresponding to each vehicle wheel. These vehicle height sensors are shown by reference numerals 18fr, 18fl, 18rr and 18rl respectively in FIG. 2, detecting vehicle heights Hfr, Hfl, Hrr and Hrl of the portions corresponding to respectively the front right wheel, the front left wheel, the rear right wheel, and the rear left wheel.

Each actuator 4 may be constructed so that its rod 9 extends to pass through only the lower end wall as seen in the diagram of the cylinder 5. In this case, as the piston 6 reciprocates, the volume of the cylinder occupied by the rod 9 will vary, as a result of which if the cross-sectional area of the upper surface of the piston is A1, and the area of the lower end of the piston is A2, then the hydraulic servo valve 12 will be constructed so that by varying the pressure P1 within the upper chamber and the pressure P2 within the lower chamber according to a control signal from the amplifier 16, it will be controlled such that a force of A1·P1−A2·P2 is produced. The actuator 4 may also be connected to the vehicle body 3 by the rod 9 and to the vehicle wheel 2 by the cylinder 5. Furthermore the reservoir 13 and the hydraulic pressure generating device 14 may be common to all of the servo actuators, and the operating fluid may be any fluid other than oil provided only that it is a substantially incompressible fluid.

The input signal to the adder 15 is formed from a control signal F (respectively Ffr, Ffl, Frr and Frl for the servo actuators 1fr, 1fl, 1rr and 1rl) for controlling the displacement from a base position of the piston 6 with respect to the cylinder 5 or the relative velocity of the piston with respect to the cylinder, these being input from an electronic control device 20 shown in FIG. 2 and the feedback signal Ffb despatched from the load sensor 17.

The electronic control device 20 is constructed as shown in FIG. 2. The output signal from the vehicle height sensor 18fr indicating the height Hfr of the portion corresponding to the front right wheel is input to the adders 21 and 23, and the output signal from the vehicle height sensor 18fl indicating the height Hfl of the portion corresponding to the front left wheel is input to the adder 21 and the adder 24. Similarly, the output signal from the vehicle height sensor 18rr indicating the height Hrr of the portion corresponding to the rear right wheel is input to the adders 22 and 23, and the output signal from the vehicle height sensor 18rl indicating the height Hrl of the portion corresponding to the rear left wheel is input to the adders 22 and 24. The output signal from the adder 21 is input to a + input terminal of an adder 25, and to a − input terminal of an adder 26, and the output signal from the adder 22 is input to + input terminals of the adders 25 and 26. To the − input terminal of the adder 25 is input a signal indicating 4H, where H is the average vehicle height for all vehicle wheels in the normal state. The output signals of the adders 23 and 24 are also input to a − input terminal and a + input terminal respectively to an adder 27.

The output signal from the adder 25 indicating (Hfr+Hfl +Hrr +Hrl−4H), in other words the bounce amount from the normal state of the vehicle body, is multiplied by a factor Kb by an amplifier 28, and after passing through an A/D converter 29, is input to a microcomputer 30. Similarly the output signal from the adder 26 indicating (Hrr+Hrl)−(Hfr+Hfl), in other words the pitch amount from the normal state of the vehicle body, is multiplied by a factor Kp by an amplifier 31, and after passing through an A/D converter 32, is input to a microcomputer 33. Similarly the output signal from the adder 27 indicating (Hfl+Hrl)−(Hrl+Hrr), in other words the roll amount from the normal state of the vehicle body, is multiplied by a factor Kr by an amplifier 34, and after passing through an A/D converter 35, is input to a microcomputer 36.

The output signal from the microcomputer 30, after passing through a D/A converter 37, is input to a + input terminal of adders 40 to 43. The output signal from the microcomputer 33, after passing through a D/A converter 38, is input to + input terminals of adders 40 and 41, and a − input terminal of adders 42 and 43. The output signal from the microcomputer 36, after passing through a D/A converter 39, is multiplied by factors Nf and Nr (Nf>0, Nr>0, Nf+Nr=1) respectively by amplifiers 44 and 45, and the output from the amplifier 44 is input to a + input terminal of the adder 40 and a − input terminal of the adder 41, whereas the output signal from the amplifier 45 is input to a + input terminal of the amplifier 42 and a − input terminal of the amplifier 43. The adders 40 to 43 output respectively the control signals Ffr, Ffl, Frr and Frl to the corresponding servo actuators.

Figure 2A:
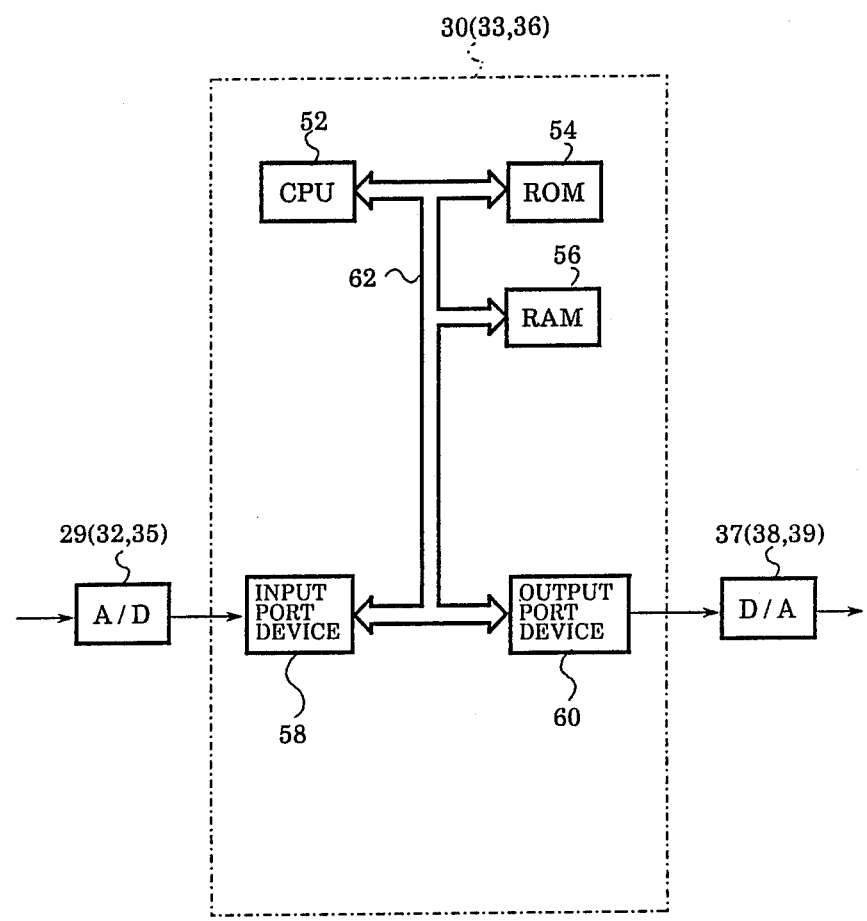
FIG. 2A is a block diagram of a microcomputer in the electronic control device shown in FIG. 2.

The microcomputers 30, 33 and 36 may be of an ordinary construction as shown in FIG. 2A, having a central processing unit (CPU) 52, a read only memory (ROM) 54, a random access memory (RAM) 56, an input port device 58 and an output port device 60, these being connected together by a two-way common bus 62.

Signals indicating a bounce amount B, a pitch amount P and a roll amount R from A/D converters 29, 32 and 35 respectively are input to the input port device 58 of each of the microcomputers 30, 33 and 36. The ROM 54 of each of the microcomputers 30, 33 and 36 contains program corresponding to the flowcharts shown in respectively FIG. 3, FIG. 12 and FIG. 13, program to generate a force pattern as shown in the upper portion of FIG. 4 to FIG. 11, and the calculation expressions described below. A RAM 56 in each microcomputer stores temporarily data input through the input port device 58, and calculation results from the CPU; the CPU 52 outputs signals indicating force patterns necessary to reduce bounce, pitch and roll to D/A converters 37 to 39 respectively from the output port device 60 based on the calculation results, and thus control signals Ffr, Ffl, Frr and Frl are input to the + input terminal of the adder 15 of the respective servo actuators 1fr, 1fl, 1rr and 1rl.

Figure 4:
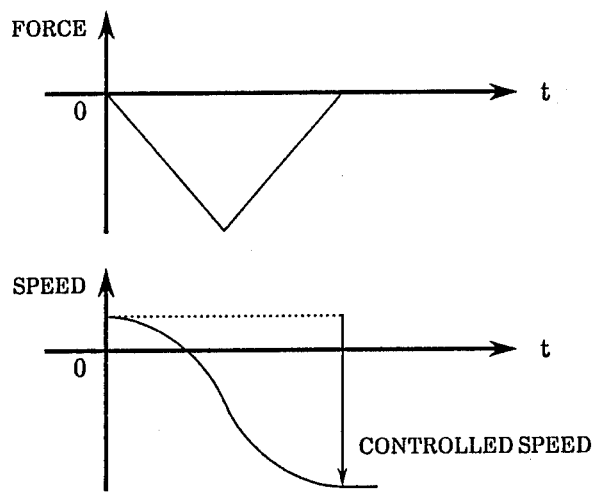
FIG. 4 and FIG. 5 are schematic diagrams showing in the case that the actuator is in the state of expanding and in the case that the actuator is in the state of being compressed respectively, a force pattern (upper diagram) and an acceleration pattern (lower diagram) of a relatively rapid reduction velocity control (compression) and a relatively rapid increase velocity control (expansion) of the velocity of the vehicle body.
Figure 5:
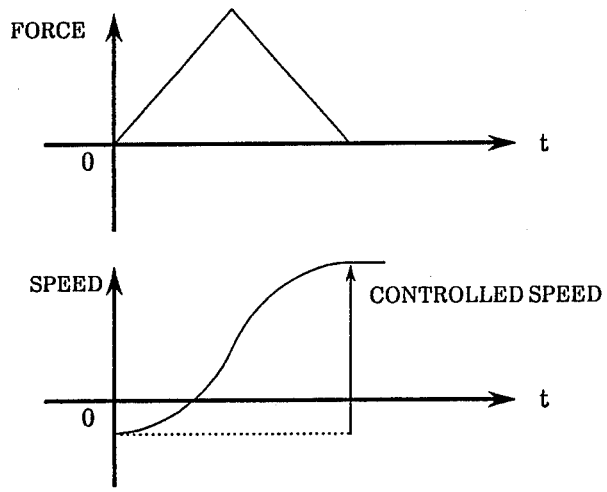
Figure 6:
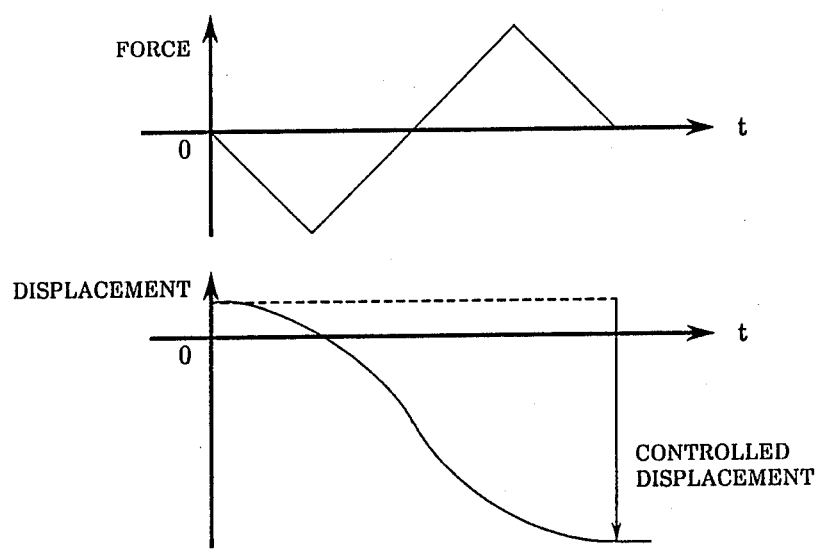
FIG. 6 and FIG. 7 are schematic diagrams showing in the case that the actuator is in the state of expanding and in the case that the actuator is in the state of being compressed respectively, a force pattern (upper diagram) and a displacement pattern (lower diagram) of a relatively sudden reduction velocity control (compression) and a relatively sudden increase velocity control (expansion) of the displacement amount from a basic position of the vehicle body.
Figure 7:
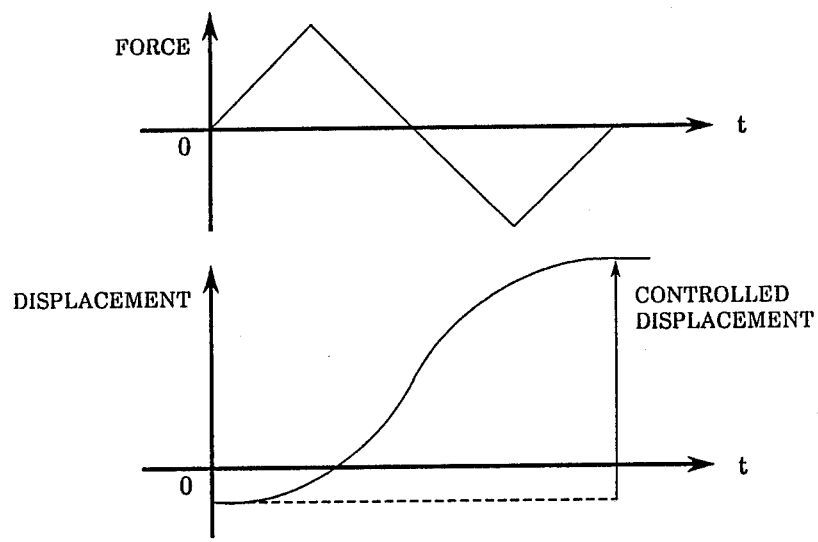
Figure 8:
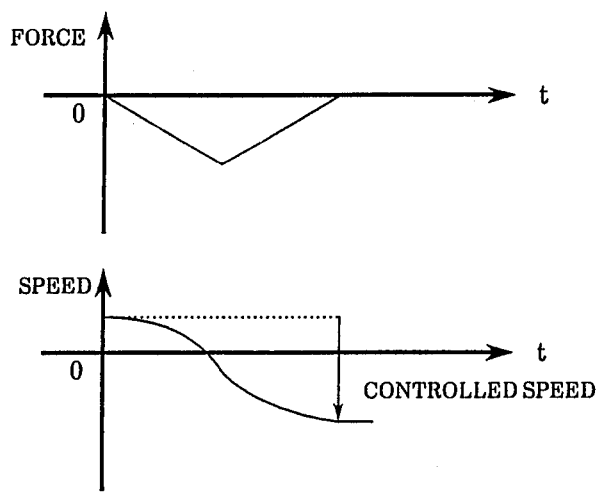
FIG. 8 and FIG. 9 are schematic diagrams showing in the case that the actuator is in the state of expanding and in the case that the actuator is in the state of being compressed respectively, a force pattern (upper diagram) and an acceleration pattern (lower diagram) of a relatively gradual reduction velocity control (compression) and a relatively gradual increase velocity control (expansion) of the velocity of the vehicle body.
Figure 9:
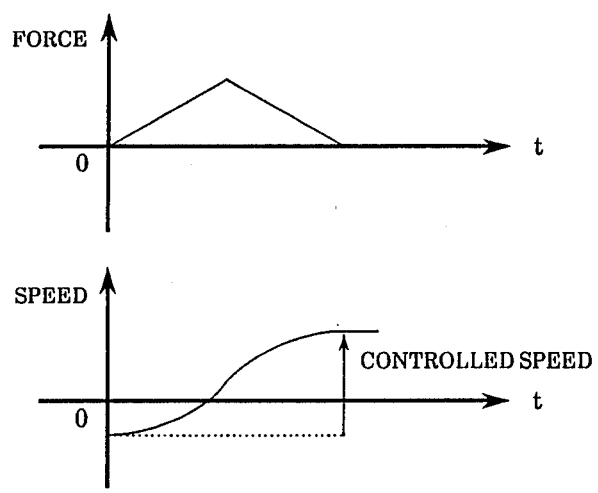
Figure 10:
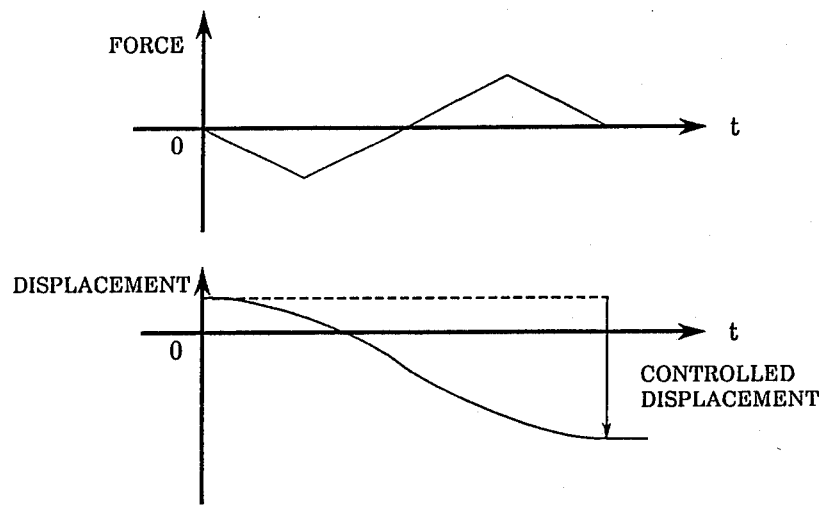
FIG. 10 and FIG. 11 are schematic diagrams showing in the case that the actuator is in the state of expanding and in the case that the actuator is in the state of being compressed respectively, a force pattern (upper diagram) and a displacement pattern (lower diagram) of a relatively gradual reduction displacement control (compression) and a relatively gradual increase displacement control (expansion) of the displacement amount from a basic position of the vehicle body.
Figure 11:
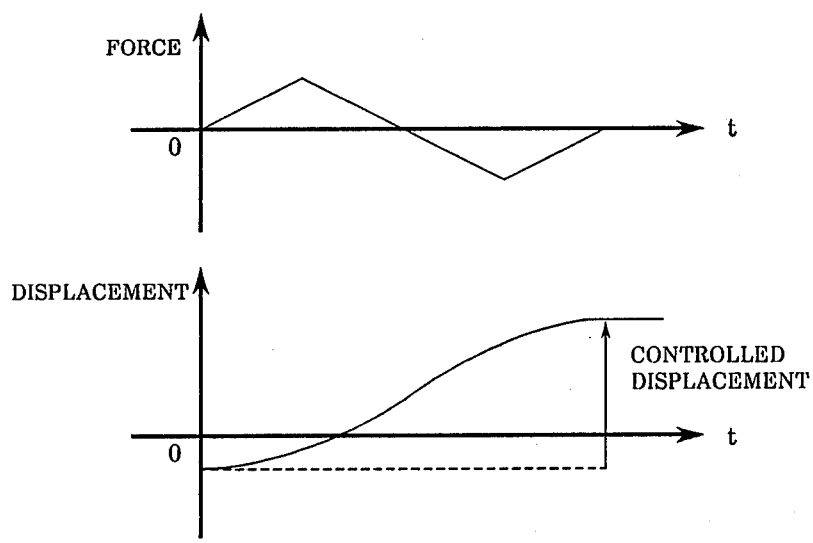

Next with reference to FIGS. 3 to 11 the flowchart for bounce control shown in FIG. 3 will be explained. It should be noted that FIG. 4 and FIG. 5 show a force pattern (upper diagram) and an velocity pattern (lower diagram) of relatively suddenly decreased velocity control (compression) and relatively suddenly increased velocity control (expansion) of the vehicle body in the cases respectively that the actuator is in the state of expanding and in the state of being compressed; it should be noted that FIG. 6 and FIG. 7 show a force pattern (upper diagram) and a displacement pattern (lower diagram) of respectively relatively suddenly reduced displacement control (compression) and relatively suddenly increased displacement control (expansion) of the displacement amount from a standard position of the vehicle body when the actuator is respectively in the state of expanding state and in the state of being compressed; it should be noted that FIG. 8 and FIG. 9 show a force pattern (upper diagram) and an velocity pattern (lower diagram) of respectively relatively gradually reduced velocity control (compression) and relatively gradually increased velocity control (expansion) of the velocity of the vehicle body when the actuator is respectively in the state of expanding and in the state of being compressed; and it should be noted that FIG. 10 and FIG. 11 show a force pattern (upper diagram) and a displacement pattern (lower diagram) of respectively relatively gradually reduced displacement control (compression) and relatively gradually increased displacement control (expansion) of the displacement amount from a standard position of the vehicle body in the case that the actuator is respectively in the state of expanding and in the state of being compressed.

First in the first step 101, reading of the bounce amount B is carried out, and thereafter control proceeds to step 102.

In step 102, the fluctuation amount DELTA B of the bounce amount B read in in step 101 is calculated according to the expression (1) below, and thereafter control goes to step 103.

$$\text{DELTA } B = B_n - B_{n-1} \ldots (1)$$

In step 103, based on expression (2) below, the bounce increase velocity Vb (where the direction of expansion of the actuator is taken as positive) is calculated, and thereafter control proceeds to step 104. It should be noted that in the expression (1) above and the expression (2) below, $B_{n-1}$ is a value detected and calculated a time interval of DELTA t before the detection of a respective value $B_n$, and DELTA t may be the cycle time of the flowchart shown in FIG. 3 or a short time interval such as between 50 and 100 ms.

$$Vb = \text{DELTA } B / \text{DELTA } t \ldots (2)$$

In step 104, a test is made as to whether the velocity Vb calculated in step 103 is at least a certain value $Vb_o$ (a positive constant), or in other words whether the expansion of the actuator is rapid or not, and when a decision is made to the effect that Vb is greater than or equal to $Vb_o$, control proceeds to step 105, whereas when a decision is made to the effect that it is not true that Vb is greater than or equal to $Vb_o$, control proceeds to step 110.

In step 105 a test is made as to whether or not the bounce amount B read in in step 101 is at least a certain value Bm (a positive constant value), or in other words whether the expansion of the actuator is excessive or not, and in the case that a decision is made to the effect that B is greater than or equal to Bm, control proceeds to step 107 which is the portion for which the road surface is a rapid downhill or is a falling uneven road surface, whereas when a decision is made to the effect that it is not true that B is greater than or equal to Bm, control proceeds to step 106 which is for a road surface of which the undulations of the road surface are small.

In step 106, the value which is the output F (Ffr, Ffl, Frr and Frl) of the electronic control device to be input to the adder of each actuator is maintained without change according to a force pattern generation module (unchanged velocity), and thereafter control returns to step 101.

In step 107, by varying the force pattern of each actuator as shown in FIG. 4 (compression) according to a force pattern generation module for velocity control, the output F of the electronic control device to be input to the adder of each servo actuator is varied in such a way as to vary the absolute velocity of the vehicle body in the manner shown in FIG. 4, and thereafter control proceeds to step 108. As used herein, the absolute speed and displacement of the vehicle body refers to the vehicle body speed and displacement toward and away from the road surface, as opposed to a vehicle wheel.

In step 108, a test is made as to whether or not the bounce fluctuation amount DELTA B calculated in step 102 exceeds a certain value DELTA $B_o$ (a positive constant), or in other words as to whether or not the vertical fluctuation of the road surface in a downward direction is large, and if a decision is made to the effect that DELTA B is not greater than DELTA $B_o$, control returns to step 101, whereas when a decision is made to the effect that DELTA B is greater than DELTA $B_o$, then control proceeds to step 109.

In step 109, by varying the force pattern of each actuator as shown in FIG. 6 (compression) according to a force pattern generation module for displacement control, the output F of the electronic control device to be input to the adder of each servo actuator is varied in such a way as to vary the displacement amount from a standard position of the vehicle body as shown in FIG. 6, and thereafter control returns to step 101.

In step 110, a test is made as to whether or not the velocity Vb calculated in step 103 is not more than a certain value $-Vb_o$, or in other words whether or not the compression of the actuator is rapid, and in the case that a decision is made to the effect that Vb is less than or equal to $-Vb_o$, then control proceeds to step 111, whereas when a decision is made to the effect that it is not true that Vb is less than or equal to $-Vb_o$, since the slope of the road surface is gentle, control proceeds to step 116.

In step 111, a test is made as to whether or not the bounce amount read in in step 101 is not more than a certain value $-Bm$, or in other words whether or not the compression of the actuator is excessive, and in the case that a decision is made to the effect that B is less than or equal to $-Bm$, control proceeds to step 113 which is a portion for which the road surface is a rapidly rising hill or a rising undulation in the road surface, whereas when a decision is made to the effect that it is not the case that B is less than or equal to $-Bm$, then control proceeds to step 112 since the road surface is a road surface of which the undulations are small.

In step 112, the value which is the output F of the electronic control device to be input to the adder of each actuator is preserved as it is according to a force pattern generation module (unchanged velocity), and thereafter control returns to step 101.

In step 113, by varying the force pattern of each actuator in the manner shown in FIG. 5 (expansion) according to a force pattern generation module for velocity control, the output F of the electronic control device to be input to the adder of each servo actuator is varied in such a way as to vary the absolute velocity of the vehicle body as shown in FIG. 5, and thereafter control goes to step 114.

In step 114, a test is made as to whether or not the bounce fluctuation amount DELTA B calculated in step 102 is less than a certain value $-$DELTA $B_o$, or in other words as to whether or not the road surface is one of which the vertical fluctuation is large in an upward direction, and when a decision is made to the effect that DELTA B is not less than $-$DELTA $B_o$, then control returns to step 101, whereas when a decision is made to the effect that it is true that DELTA B is less than $-$DELTA $B_o$, then control proceeds to step 115.

In step 115, by varying the force pattern of each actuator as shown in FIG. 7 (expansion) according to a force pattern generation module for displacement control, the output F of the electronic control device to be input to the adder of each servo actuator is varied in such a way as to vary the displacement amount from a standard position of the vehicle body as shown in FIG. 7, and thereafter control returns to step 101.

In step 116, a test is made as to whether or not the absolute value of the average velocity Vb calculated in step 103 is at least a minimum velocity value Vbm, and in the case that a decision is made to the effect that the absolute value of Vb is greater than or equal to Vbm, control proceeds to step 117, whereas in the case that a decision is made to the effect that it is not true that the absolute value of Vb is greater than or equal to Vbm, then control proceeds to step 120.

In step 117, a test is made as to whether or not DELTA B is positive, or in other words as to whether or not the actuator is in the process of expanding, and when a decision is made to the effect that DELTA B is greater than 0, control proceeds to step 118, whereas when a decision is made to the effect that it is not the case that DELTA B is greater than 0, control proceeds to step 119.

In step 118, by varying the force pattern of each actuator as shown in FIG. 8 (compression) according to a force pattern generation module for velocity control, the output of the electronic control device to be input to the adder of each servo actuator is varied in such a way as to vary the absolute velocity of the vehicle body as shown in FIG. 8, and thereafter control returns to step 101.

In step 119, by varying the force pattern of each actuator as shown in FIG. 9 (expansion) according to a force pattern generation module for velocity control, the output of the electronic control device to be input to the adder of each servo actuator is varied in such a way as to vary the absolute velocity of the vehicle body as shown in FIG. 9, and thereafter control returns to step 101.

In step 120, a test is made as to whether or not the absolute value of the bounce amount B is at least a certain minimum value Bm, or in other words as to whether or not the displacement amount of the piston with respect to the cylinder is greater than a certain range, and when a decision is made to the effect that the absolute value of the bounce amount B is greater than or equal to Bm, then control proceeds to step 122, whereas when a decision is made to the effect that it is not true that the absolute value of the bounce amount B is greater than or equal to Bm, then control proceeds to step 121.

In step 121, the output F of the electronic control device to be input to the adder of each servo actuator is preserved unchanged according to a force pattern generation module (unchanged velocity), and thereafter control returns to step 101.

In step 122, a test is made as to whether or not the bounce amount B read in in step 102 is positive, or in other words as to whether or not the actuator is in the expanded state such that its piston is in a position below the standard position, and when a decision is made to the effect that B is greater than 0, then control proceeds to step 123, whereas when a decision is made to the effect that it is not true that B is greater than 0, control proceeds to step 124.

In step 123, by varying the force pattern of each actuator as shown in FIG. 10 (compression) according to a force pattern generation module for displacement control, the output F of the electronic control device to be input to the adder of each servo actuator is varied in such a way as to vary the displacement amount of the vehicle body from a standard position as shown in FIG. 10, and thereafter control returns to step 101.

In step 124, by varying the force pattern of each actuator as shown in FIG. 11 (expansion) according to a force pattern generation module for displacement control, the output F of the electronic control device to be input to the adder of each servo actuator is varied in such a way as to vary the displacement amount from the standard position of the vehicle body as shown in FIG. 11, and thereafter control returns to step 101.

It should be noted that steps 108 and 114 may be omitted, and then after the completion of steps 107 and 113 control will proceed respectively to step 109 and 115. Again, the Bm in steps 105 and 111 and the Bm in step 120 may have different values, and in this case if the former is Bm1 and the latter is Bm2, then it is preferable for Bm1 to be less than Bm2.

Figure 3:
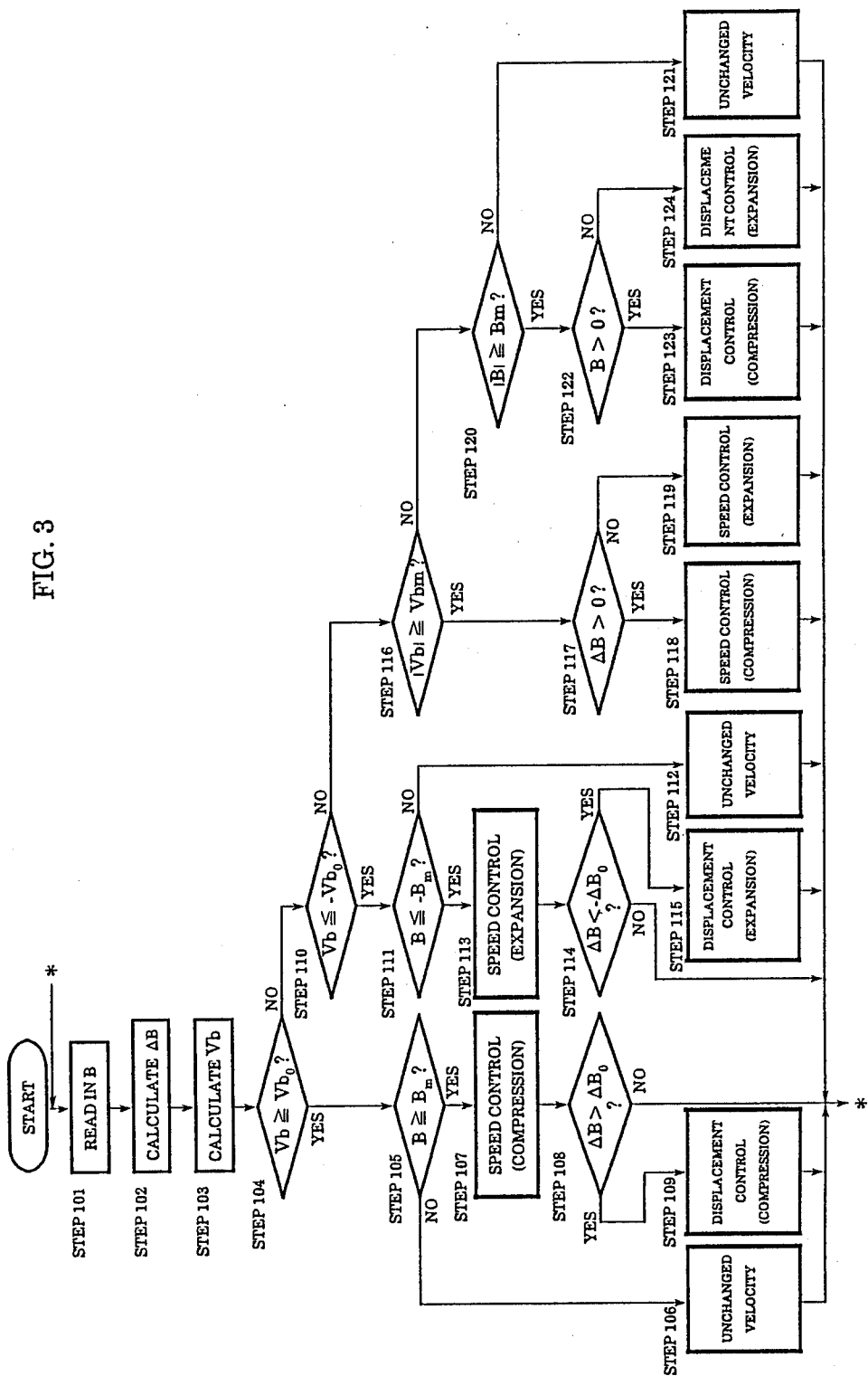
FIG. 3 is a flowchart showing bounce control flow of the electronic control device shown in FIG. 1 and FIG. 2.
Figure 12:
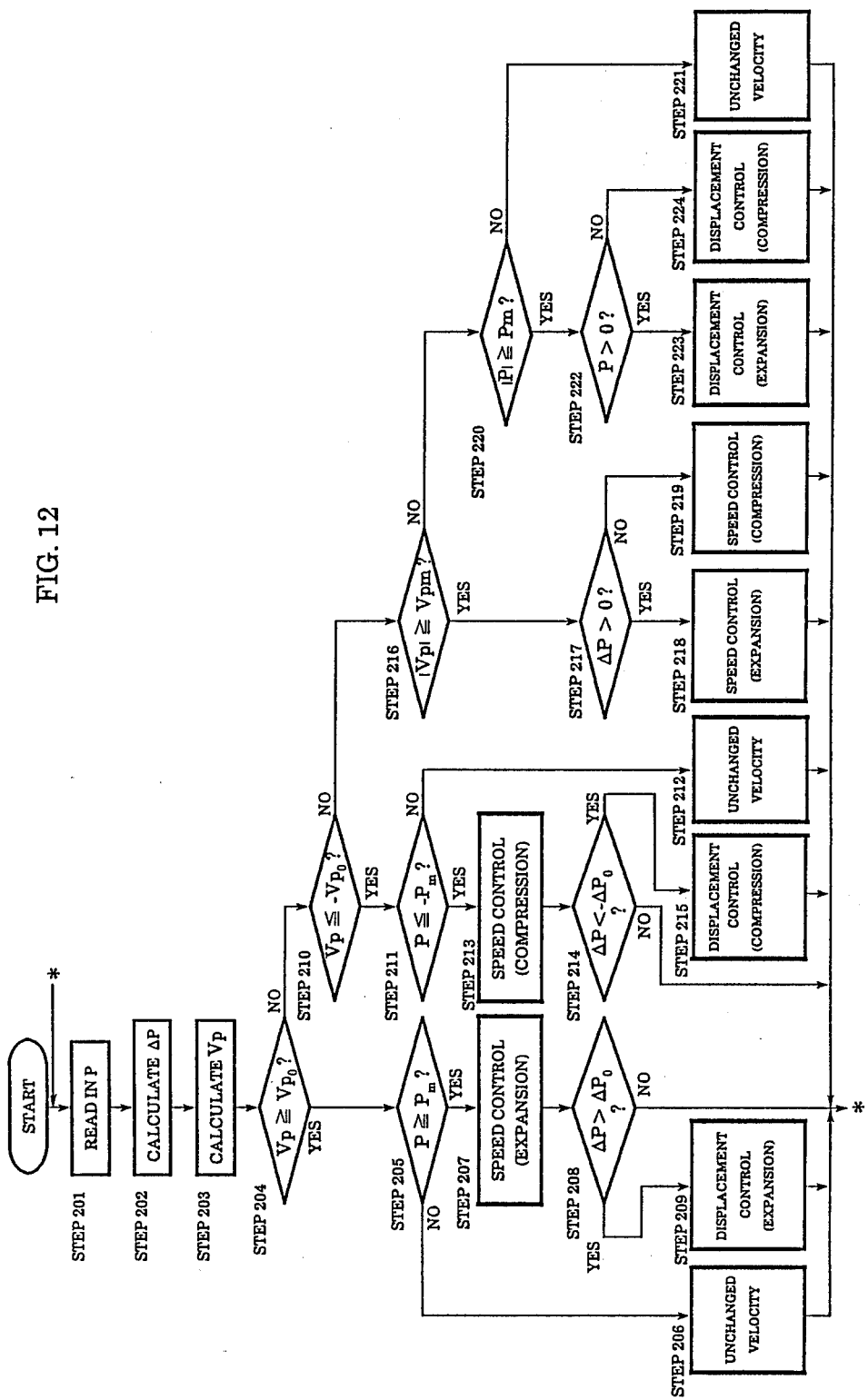
FIG. 12 and FIG. 13 are flowcharts showing the control flow of respectively pitch control and roll control of the electronic control device shown in FIG. 1 and FIG. 2.
Figure 13:
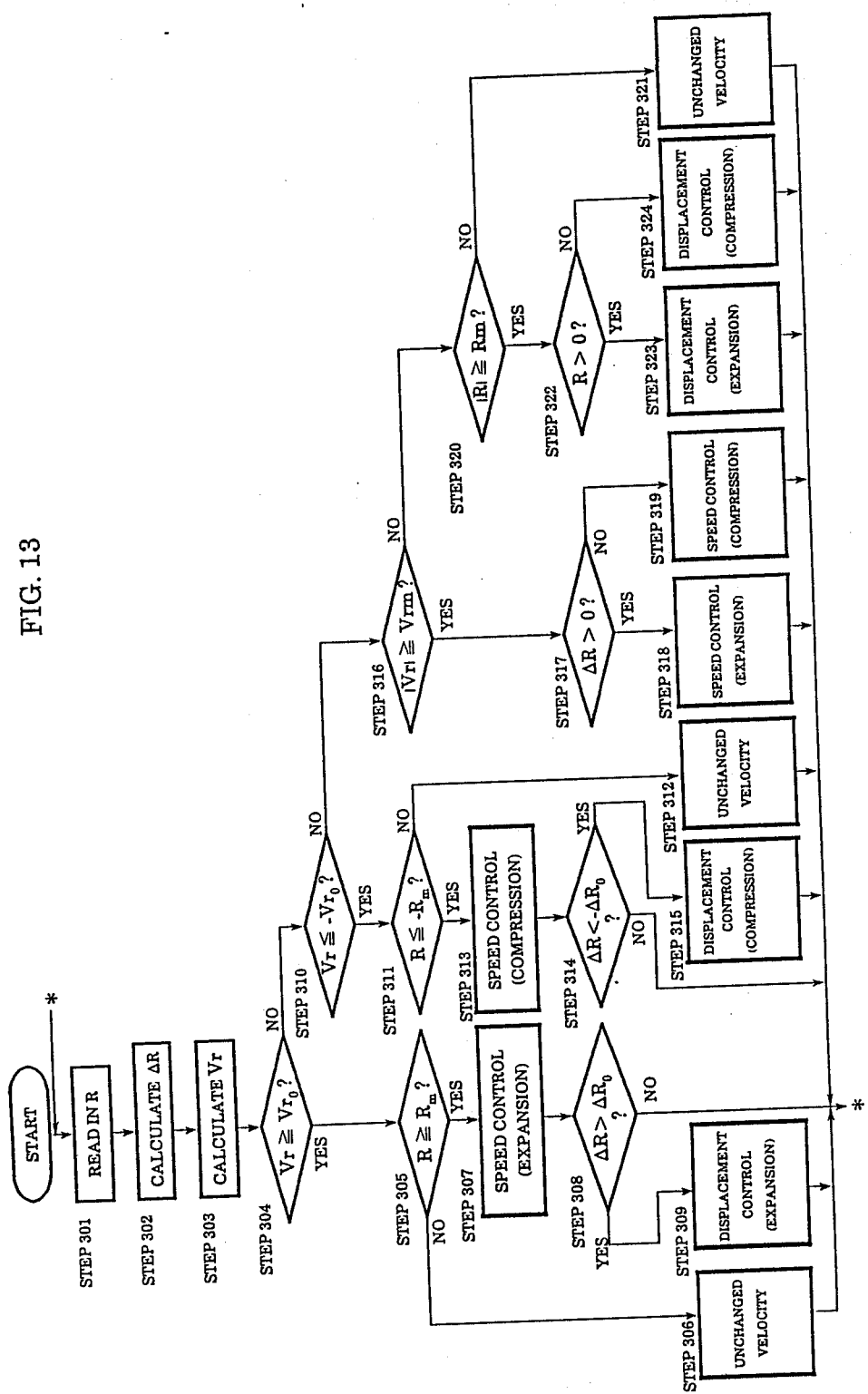

As shown in FIG. 12 and FIG. 13 respectively, the pitch control flow of the microcomputer 33 and the control flow of the microcomputer 36 are substantially the same as the control flow shown in FIG. 3. In the flowcharts shown in FIG. 12 and FIG. 13, the bounce amount B in the flowchart shown in FIG. 3 is replaced by respectively a pitch amount P and a roll amount R, the bounce fluctuation amount DELTA B is replaced by respectively a pitch fluctuation amount DELTA P and a roll fluctuation amount DELTA R, and the bounce fluctuation rate Vb is replaced by respectively a pitch fluctuation rate Vp and a roll fluctuation rate Vr. Similarly, the standard value $Vb_o$ is replaced by respectively $Vp_o$ and $Vr_o$, Vbm is replaced by respectively Vpm and Vrm, Bm is replaced by respectively Pm and Rm, DELTA $B_o$ is replaced by respectively DELTA $P_o$ and DELTA $R_o$, and the relation between expansion and compression is the reverse of that in FIG. 3.

Furthermore, in the flowchart of FIG. 12, the expansion or compression in the velocity or displacement control steps is an indication with respect to the servo actuators for the front wheels, and the indications for the servo actuators of the rear wheels are sign inverted by the adders 42 and 43 so that they become respectively compressions and expansions. Similarly, in the flowchart of FIG. 13, the expansion or compression in the velocity or displacement control steps is an indication with respect to the servo actuators for the right wheels front and rear, and the indications for the servo actuators of the left wheels front and rear are sign inverted by the adders 41 and 43 so that they become respectively compressions and expansions.

Next the operation of an embodiment of the above construction will be explained considering separately the following cases: (a) the vehicle is traveling along a level road, (b) the vehicle is traveling along a road which has small undulations so that the vertical displacement of the road surface is within the vertical stroke limits of the piston of each actuator, (c) the vehicle is traveling along a steep hill or an uneven road, (d) the vehicle is traveling along an incline such that the vertical displacement of the road surface is relatively gradual, (e) the vehicle is traveling along an incline such that the vertical displacement of the road surface is extremely gradual, and (f) the vehicle is traveling along a road surface of which the inclination to right and left with respect to the direction of travel fluctuates.

(a) Case that the vehicle is traveling along a flat road

In this case in the flowchart shown in FIG. 3, a no decision is made in steps 104, 110, 116 and 120, and a no decision is also made in the corresponding steps in the flowcharts shown in FIG. 12 and FIG. 13; in steps 121, 221, and 321 the output F of the electronic control device to be input to the adder of each servo actuator is preserved unchanged, and since the force to be applied to the vehicle by each actuator is not changed, the vehicle body is maintained in its current driving state by inertia (for example in a state of horizontal motion in the case of horizontal driving), and therefore in each actuator no relative movement of the cylinder and piston will occur, and in other words the vehicle will proceed without any relative displacement of the vehicle body with respect to the road surface.

(b) Case that the vehicle is traveling along a road of small undulations

In the case that the vehicle is traveling along a descending portion of a road surface having small undulations, the vertical displacements of the vehicle wheels will be at a high velocity, and the bounce amount B, pitch amount P, and roll amount R calculated from the sums and differences of the vehicle heights at the portions corresponding to the different vehicle wheels will also fluctuate rapidly, but since their fluctuation range will be small, in step 104 or 110, step 204 or 210, and step 304 or 310, a yes decision will be made, and in step 105 or 111, step 205 or 211, and step 305 or 311, a no decision will be made, and therefore in step 106 or 112, step 206 or 212, and 306 or 312, the output F of the electronic control device to be input to the adder of each servo actuator will be maintained at an unchanged value. Therefore, the force to be applied from each actuator to the vehicle body will not be changed, as a result of which the vehicle body will be maintained in its current state of motion by inertia, and the vehicle will proceed with the vehicle wheels only following the undulations in the road surface. In other words the vehicle wheels will be displaced vertically following the undulations in the road surface, whereas in this case as above in case (a) the vehicle will not oscillate vertically at all.

(c) Case that the vehicle is traveling along a steep incline

In the case that the vehicle changes from the state of traveling horizontally to traveling along a descending portion of a road surface being a steep downhill or unevenness, in steps 104 and 105 a yes decision is made, and in step 107 following a force pattern generation module for velocity control (compression, K large), the absolute velocity of the vehicle body is controlled in such a way that the vehicle body is driven downward with a relatively large force, and a downward velocity component is imparted to the vehicle body; in step 204 a no decision is made, in steps 210 and 211 a yes decision is made, and in step 213 following a force pattern generation module for velocity control (compression, K large), the absolute velocity of the vehicle body is controlled in such a way that the front portion of the vehicle body is driven downward with a relatively large force, and the rear portion of the vehicle body is driven upward with a relatively large force, and a velocity component is imparted to the vehicle body such that the vehicle front moves downward about the pitch center; thus the vehicle body is caused to move into a state where it is substantially parallel to the road surface of the downward incline.

In this case, when the vertical amount of displacement of the road surface being driven on is large, a yes decision is made in steps 108 and 214, so that in steps 109 and 215, following a force pattern generation module for displacement control (compression) a vehicle height adjustment to reduce the displacement amount of the piston, or in other words a vehicle height reduction adjustment, is carried out, and a pitch adjustment is made to compensate for the front upward movement of the vehicle body with respect to the road surface; in the case that the vertical amount of displacement of the road surface is small, control returns to step 101.

In the case that the vehicle changes from the state of traveling horizontally to traveling along an ascending portion of a road surface being a steep uphill incline or unevenness, a no decision will be made in step 104, and a yes decision will be made in steps 110 and 111, and in step 113, following a force pattern generation module for velocity control (expansion, K large), the absolute velocity of the vehicle body will be controlled in such a way that the vehicle body is driven upward with a large force, and a velocity component upward is imparted to the vehicle body; in steps 204 and 205 a yes decision is made, and in step 207 following a force pattern generation module for velocity control (expansion, K large), the absolute velocity of the vehicle is controlled in such a way that the front portion of the vehicle body is driven upward, and the rear portion of the vehicle body is driven downward, and a velocity component is imparted to the vehicle body such that the vehicle front moves upward about the pitch center; thus the vehicle body is caused to move into a state where it is substantially parallel to the road surface of the upward incline.

In this case, when the vertical amount of displacement of the road surface being driven on is large, a yes decision is made in steps 114 and 208, so that in steps 115 and 209, following a force pattern generation module for displacement control (expansion), a vehicle height adjustment to increase the displacement amount of the piston, or in other words a vehicle height increase adjustment, is carried out, and a pitch adjustment is made to compensate for the front downward movement of the vehicle body with respect to the road surface; in the case that the vertical amount of displacement of the road surface is small, control returns to step 101.

Thus in the case that the vehicle is on the point of traveling along a sudden incline or the like, a velocity component in the vertical direction will be imparted to the vehicle body, whereby the vehicle body will be allowed to be in a state of motion along the incline or the like by inertia, and the vehicle body will be caused to be in a state parallel to the road surface of the incline, and if the inclination of the inclined road varies by more than a certain amount, the velocity component of the vertical motion of the vehicle body will be varied according to the inclination of the incline, and thereby the vehicle will be caused to travel smoothly along the inclined road with the vehicle body parallel to the road surface.

If the inclination of the inclined road is substantially constant, and the vehicle body is once given the state of traveling along the inclined road by inertia with the vehicle body parallel to the road surface, then in steps 104 and 110 a no decision will be made, and in steps 204 and 210 a no decision will be made, and thereby control will be carried out in the same way as in case (a) described above or cases (d) and (e) described below. In the case that the inclination of the inclined road is substantially constant and there are small undulations in the surface, then in steps 104 and 110 and steps 204 and 210 a yes decision will be made, but in steps 105 and 111 and steps 205 and 211 a no decision will be made, and control will be carried out in the same way as in case (b) described above, and therefore the vertical motion of the vehicle wheel traveling along the undulations in the road surface will be prevented from being transmitted to the vehicle body.

(d) Case that the vehicle is traveling along a relatively gradual inclined road

In this case, a no decision will be made in steps 104 and 110 and steps 204 and 210, and in steps 116 and 216 a yes decision will be made. In the case that the vehicle is traveling along a descending portion of an inclined road, in step 117 a yes decision will be made, and in step 118, following a force pattern generation module for velocity control (compression), control will be carried out to impart a compression to each actuator, in other words in the direction of imparting a downward velocity component to the vehicle body, while in step 217 a no decision will be made and in step 219, following a force pattern generation module for velocity control (compression), a velocity component will be imparted to the vehicle body such as to drive the front of the vehicle downward and the rear of the vehicle upward, and thus the vehicle body will be caused to be in a state parallel to the road surface.

On the other hand, in the case that the vehicle is traveling along an ascending portion of an inclined road, in step 117 a no decision will be made, and in step 119, following a force pattern generation module for velocity control (expansion), control will be carried out to impart an expansion to each actuator, in other words in the direction of imparting an upward velocity component to the vehicle body, while in step 217 a yes decision will be made and in step 218, following a force pattern generation module for velocity control (expansion), a velocity component will be imparted to the vehicle body such as to drive the front of the vehicle upward and the rear of the vehicle downward, and thus the vehicle body will be caused to be in a state parallel to the road surface.

Thus when the vehicle is traveling along a relatively gradual inclined road, by applying a velocity component in the vertical direction to the vehicle body, the vehicle will be caused to travel along the inclined road by inertia with the vehicle body parallel to the road surface, and thereby the vehicle will be caused to travel smoothly along the inclined road.

(e) Case that the vehicle is traveling along an extremely gradual inclined road

In this case, a no decision will be made in steps 104, 110, 116, 204, 210 and 216, and when the bounce amount and pitch amount are within certain limits, in steps 120 and 220 a no decision will be made, and in steps 121 and 221 the output F of the electronic control device to be input to the adder of each servo actuator will be maintained at an unchanged value, whereby although the vehicle wheel will be displaced along the surface of the inclined road, the control will be such that the vehicle body is maintained by inertia in its current state of motion. If, however, the bounce amount and pitch amount are outside these limits, then in steps 120 and 220 a yes decision will be made.

In this case, when the vehicle is traveling along a descending slope, in step 122 a yes decision will be made, and in step 123, following a force pattern generation module for displacement control (compression), a vehicle height adjustment to reduce the displacement amount of the piston, in other words a vehicle height reduction adjustment will be carried out, while in step 222 a no decision will be made and in step 224, following a force pattern generation module for displacement control (compression), the vehicle height of the front portion of the vehicle body will be reduced, and the vehicle height of the rear of the vehicle body will be increased, and thus the vehicle body will be caused to be in a state parallel to the road surface.

On the other hand, when the vehicle is traveling along an ascending slope, in step 122 a no decision will be made, and in step 124, following a force pattern generation module for displacement control (expansion), a vehicle height adjustment to increase the displacement amount of the piston, in other words a vehicle height increase adjustment will be carried out, while in step 222 a yes decision will be made and in step 223, following a force pattern generation module for displacement control (expansion), the vehicle height of the front portion of the vehicle body will be increased, and the vehicle height of the rear of the vehicle body will be reduced, and thus the vehicle body will be caused to be in a state parallel to the road surface.

Thus in the case that the vehicle is traveling along an extremely gradual incline, when the piston stroke of the actuator is within its limits, the vehicle body is maintained in an unchanged driving attitude, but when the piston stroke limit is exceeded, a vehicle height increase or decrease adjustment is carried out, whereby the vehicle is ensured to travel along the inclined road with the vehicle body parallel to the road surface.

(f) Case that the vehicle is traveling along a road surface of which the inclination in the left-right direction with respect to the direction of travel varies In the case that the rate of fluctuation of the inclination in the left to right direction of the road surface is large, then according to the inclination direction of the road surface, a yes decision will be made in step 304 or 310, and in step 305 or 311 respectively a yes decision will be made, and then in respectively step 307 or 313, following a force pattern generation module for velocity control (compression, K large) or velocity control (expansion, K large), a relatively large velocity component will be imparted to the vehicle body in the roll direction so that the vehicle body follows the fluctuation in the inclination of the road surface, whereas in the case that the rate of fluctuation of the inclination in the left to right direction of the road surface is moderate, then according to the direction of the fluctuation in step 318 or 319 following a force pattern generation module for velocity control (compression) or velocity control (expansion), a velocity component will be imparted to the vehicle body in the roll direction such that the vehicle body follows the fluctuation in the inclination of the road surface, and thereby the vehicle is caused to travel with the vehicle body parallel to the road surface.

Furthermore, in the case that the fluctuation in the inclination in the right and left direction of the road surface is relatively small, according to the fluctuation direction, in steps 309, 315, 323, or 324, a vehicle height adjustment with an increase or decrease to left or right of the vehicle body according to the fluctuation direction of the road surface inclination will be carried out such that the vehicle body is caused to be parallel to the road surface, and thereby the vehicle body will be caused to be substantially parallel to the road surface, and in the case that the inclination of the road surface in the left to right direction is extremely small a vehicle height adjustment to right or left of the vehicle body will not be made and the vehicle will be maintained in its current state.

In the case that the vehicle is ascending or descending a curved and banked road, then control of the vehicle body will be carried out according to a combination of the cases (c), (d), or (e) and (f).

From the above description, it will be understood that according to the above described embodiment, not only of course in the case that the vehicle is traveling along a flat road, but also in the case that the vehicle is traveling along a road surface of small undulations, the support force with respect to the vehicle body of each actuator is not increased or decreased, and thereby the vehicle wheel will travel along the undulations in the road surface, but the vehicle body will be maintained in its current driving attitude inertia (for example in the case of horizontal driving, a horizontal motion attitude), and in the case that the vehicle is traveling along an incline or whatever, each vehicle wheel of the vehicle body will be given a vertical displacement according to the vertical displacement of the incline or whatever, or given a vertical acceleration or deceleration, and thereby the vehicle will be caused to travel with the vehicle body in a state parallel to the road surface following to the vertical displacement of the incline or whatever, and also in this case even if there are small undulations in the road surface of the incline or whatever, the vehicle wheel will travel along the undulations in the road surface, but the vehicle body will be maintained in its current driving attitude by inertia (driving attitude following the overall inclination of the inclined road surface), as a result of which whatever the state of the vertical displacement of the road surface, the vehicle wheel will be caused to be able to travel along it, and compared with the case of a conventional spring type suspension or the suspension described in the above mentioned bibliography, the ride comfort of the vehicle will be substantially improved.

It should be noted that in the above embodiment, in the force pattern generation modules of steps 107 and so forth, of the flowcharts of FIG. 3, FIG. 12 and FIG. 13, the force patterns are each constant, but the construction may be such that for each module a plurality of force patterns is determined and stored in a ROM of the microcomputer, and then respective appropriate force patterns selected, for example, in steps 107 and 113 according to the sizes of the absolute value of the bounce amount B and the absolute value of the fluctuation amount DELTA B, in steps 109 and 115 according to the size of the absolute value of the fluctuation amount DELTA B, in steps 118 and 119 according to the size of the absolute value of the bounce fluctuation rate Vb, and in steps 123 and 124 according to the size of the absolute value of the bounce amount B.

Moreover, in the pitch and roll control according to the control flow shown in FIG. 12 and FIG. 13, the construction may be such that only one each of respectively the front and rear vehicle wheels and the left and right vehicle wheels is moved vertically, and by carrying out the reading in of the bounce amount B and so forth by interrupts with a period shorter than the cycle time of the control flows, and using the average value for the bounce amount B and so forth, the motion control of the vehicle body can be carried out in a more accurate fashion.

Furthermore, the microcomputers 30, 33 and 36 may be replaced by a single microcomputer executing the control flow shown in FIG. 3, FIG. 12 and FIG. 13 in time sequence; the calculation carried out by the portions of the electronic control device of analog construction may be calculated digitally by the microcomputer or microcomputers; and furthermore the electronic control device of FIG. 3 may be constructed so that the amplification by the amplifiers 28, 31 and 34 is adjustable by vehicle passengers, so that the vehicle body bounce, pitch and roll control is adjustable according to the taste of the passengers.

In the above, the present invention has been described in detail with respect to a specific embodiment, but the present invention is not limited to this, and it will be clear to those skilled in the relevant art that various embodiments are possible within the scope of the present invention.

I claim:

1. An active suspension for a vehicle having a vehicle body, a front right wheel, a front left wheel, a rear right wheel, and a rear left wheel, comprising: a plurality of cylinder-piston type actuators, each producing a supporting force for supporting the vehicle body with respect to each corresponding one of said wheels; a plurality of vehicle height detection means detecting vehicle heights Hfr, Hfl, Hrr and Hrl of portions of the vehicle body corresponding to the front right wheel, the front left wheel, the rear right wheel, and the rear left wheel; and a calculation control device which inputs signals from said vehicle height detection means, calculates based on these signals a bounce amount B and a pitch amount P with respect to a road surface from a standard state of the vehicle body according to:

$$B = Kb\ (Hfr + Hfl + Hrr + Hrl = 4\ H)$$

$$P = Kp\ (Hrr + Hrl) - (Hfr + Hfl)$$

where Kb and Kp are positive coefficients, and H is the mean value of standard vehicle heights of said portions of the vehicle body corresponding to said respective wheels at the standard state of the vehicle body,
calculates based on said amount B and P a necessary supporting force for said actuators necessary to reduce the bounce and the pitch amount, and controls said actuators based on the necessary supporting force to increase or decrease the force acting between the wheels and the vehicle body through the actuators.

2. An active suspension according to claim 1, wherein said actuators are servo actuators each being operated to increase or decrease said supporting force provided thereby according to a positive or negative balance between an input signal based upon said necessary supporting force and a feedback signal representing said supporting force provided by said actuators.

3. An active suspension according to claim 2, wherein, when a rate of change of the amount of said bounce or pitch is larger than a predetermined value, said calculation control device changes said input signal so as to control an absolute speed of the vehicle body to follow a predetermined variation performance.

4. An active suspension according to claim 3, wherein, when the amount of said bounce or pitch is larger than a predetermined value, said calculation control device changes further said input signal so as to control an absolute displacement of the vehicle body to follow a predetermined variation performance.

5. An active suspension according to claim 1, wherein said calculation control device further calculates based on said signals a roll amount R with respect to the road surface from the standard state of the vehicle body according to:

$$R = Kr\{(Hfl + Hrl) - (Hfr + Hrr)\}$$

(where Kr is a positive coefficient), calculates based on said amount B, P and R the necessary supporting force for said actuators necessary to reduce the bounce, the pitch and the roll amount, and controls said actuators based on the necessary supporting force to increases or decrease the force acting between the wheels and the vehicle body through the actuators.

* * * * *